United States Patent Office 2,851,332
Patented Sept. 9, 1958

2,851,332
PREPARATION OF HALIDES OF PLUTONIUM

Clifford S. Garner, Los Angeles, Calif., and Iral B. Johns, Dayton, Ohio, assignors to the United States of America as represented by the United States Atomic Energy Commission No Drawing. Application April 21, 1950
Serial No. 157,398
11 Claims. (Cl. 23—14.5)

This invention relates to metal halides and more particularly, to methods for preparing said metal halides. Specifically, this invention is directed to the preparation of plutonium metal halides by dry chemistry methods.

In the past it has been necessary to employ several processes for converting the slurry of plutonium nitrate obtained by dissolving the fuel elements from a neutronic reactor to a form which is more conveniently processed as, for example, the oxalate or the oxide. Additional dry chemical processes have then been used to convert the oxide or oxalate to a readily reducible compound such as the halide of the metal. The details and operation of the dry chemical processes are set forth fully in copending patent applications S. N. 753,568, filed June 9, 1947, by Clifford S. Garner for "Dry Chemical Methods" which sets forth a method for the conversion of plutonium oxalate to plutonium halides, and S. N. 753,569, filed June 9, 1947, by Clifford S. Garner for "Production of Metal Compounds" which discloses a method for the dry chemical conversion of plutonium oxalate to the oxide. Also, copending application S. N. 753,567, filed June 9, 1947, by Norman A. Davison and Joseph J. Katz, entitled "Method For the Preparation of Plutonium Halides and Oxyhalides," specifically discloses the formation of plutonium fluoride by the dry chemistry treatment of plutonium oxide, $PuO_2$, with a hydrohalide in the presence of added hydrogen or other reducing agent. None of the above-cited applications nor any prior known method cites a single-step process for the direct and efficient conversion of plutonium nitrate to plutonium halides. It may be seen that a process for converting the nitrate directly to the halide is a desirable and valuable process in the manufacture and production of plutonium materials.

It is a primary object of this invention to provide a method for efficiently and directly converting plutonium nitrate to a plutonium halide.

A further object of this invention is to provide a method for rapidly converting higher valent plutonium nitrate to plutonium halides by dry chemistry methods.

It is another object of this invention to provide a method for the dry chemistry conversion of plutonium nitrate to plutonium chloride.

Another object of this invention is to provide a method for converting plutonium nitrate to plutonium fluoride.

Still further objects and advantages of the present invention will become apparent from the description and examples which follow.

The objects of this invention are achieved by contacting crystalline higher valent plutonium nitrate with gaseous hydrohalide at a temperature of at least 400° C. By higher valent plutonium nitrate is meant plutonium nitrate in either the plus 4 or plus 6 valence state. The latter state is commonly referred to as plutonyl nitrate, $(PuO_2)(NO_3)_2$.

While the general statement above is of sufficient scope to describe the operation of the broad claims to the invention, it is to be understood that considerable refinement of the process is obtained by control of the conditions under which the hydrohalide is admitted. When the vapors are passed over the plus 6 or plus 4 plutonium nitrate under non-oxidizing conditions, for example, in the presence of a reducing gas such as hydrogen, the tervalent halide is formed. By adding a small amount of an oxidizing gas, for example, oxygen, it is possible to form the tetrahalide. The amount of the reducing gas or oxidizing gas admitted with the hydrohalide is a minor proportion, being of the order of from 2 to 10 percent by volume.

A further improvement in the quality of the halide formed is obtained if the temperature of the plutonium nitrate is raised to about 100° C. before the hydrohalide is introduced. It is believed that when the hydrohalide is introduced at room temperature an oxyhalide is formed, which oxyhalide is converted with difficulty to the desired metal halide and may introduce other problems with respect to the subsequent reduction of the halide to the metal. However, it is important that the temperature not exceed 150° C. because the nitrate begins to decompose to the oxide at that point.

In order more clearly to describe and define the invention the following examples are presented. Example I shows one embodiment of the invention for the conversion of plutonyl nitrate directly to plutonium trifluoride.

Example I

A slurry of plus 6 plutonium nitrate in nitric acid is evaporated to dryness under a battery of heat lamps in a properly ventilated hood in order to obtain crystalline plus 6 plutonium nitrate. About 25 milligrams of the solid material are weighed out on a tarred platinum boat which is then placed in a cold muffle furnace under a platinum canopy and heated slowly in a stream of nitrogen to 125° C. At this temperature the flow of the inert gas is turned off and hydrogen fluoride is then admitted into the furnace at the rate of about 20 cubic centimeters per minute. The temperature of the furnace is increased rapidly to 500° C. and held there for 30 minutes. Under these conditions the plus 6 nitrate is converted to plutonium trifluoride at a yield of 95 percent of theoretical.

In the conversion of plutonyl nitrate to the lower valence fluoride as in the foregoing example, it is possible to use pure hydrogen fluoride without the addition of any other reducing gas, for the hydrogen fluoride reactant appears to be sufficient to insure a substantially complete reduction of the plutonyl compound. In the case of reducing plus 6 plutonium nitrate to the tetrahalide, however, a small amount of an oxidizing atmosphere is introduced with the hydrohalide to assure that the halide will be formed as the higher valence plus 4 compound.

The next example presents this further embodiment of the invention for directly converting plutonyl nitrate to plutonium tetrafluoride.

Example II

A hundred milligrams of plus 6 plutonium nitrate crystals prepared by evaporating a nitric acid solution of plus 6 plutonium nitrate to dryness are weighed in a platinum boat and the whole placed in a nickel reaction tube. The temperature in the tube is raised to about 100° C. and a mixture of hydrogen fluoride and oxygen is admitted at the rate of from 10 to 30 cubic centimeters per minute while the temperature is increased slowly to about 450° C. and held there for an hour. The amount of oxygen present in the mixture is about 2 percent by volume, and is sufficient to provide an oxidizing character to the gaseous mixture which permits the plutonyl nitrate to be readily and effectively converted to the higher valence plutonium tetrafluoride. The heat is turned off and the tube and its contents are cooled to about 50° C.

before the tube is opened. A fine lavender powder is present in the boat which on analysis is found to contain 97 percent plutonium tetrafluoride by weight.

Plutonium metal nitrates other than plutonyl nitrate may be converted to the corresponding halide by the method of this invention. For example, plus 4 plutonium nitrate may be treated in a manner similar to that disclosed in the preceding example to obtain the plus 4 halide, or, if a slightly more reducing atmosphere is employed, as by the addition of 2 to 10 percent hydrogen, with the hydrogen fluoride, the plus 3 halide may be obtained. The following example sets forth a satisfactory method for accomplishing the conversion of plus 4 plutonium nitrate to plus 3 plutonium chloride.

*Example III*

250 milligrams of the dry crystalline plus 4 plutonium nitrate are placed in a platinum dish and heated in a reaction tube to 110° C. A gaseous mixture comprising 97.5 percent hydrogen chloride and 2.5 percent hydrogen is admitted to the tube and the temperature is raised to and held at 475° C. while maintaining the flow of the gas at about 50 cubic centimeters per minute. After 90 minutes the gas flow is stopped and the heat is turned off. The tube is flushed out with nitrogen and cooled, and the blue, powdery plutonium trichloride which has formed is removed therefrom.

Other embodiments of the invention are, of course, possible. For example, plus 4 plutonium nitrate may be converted to the fluoride and other halides by the method of the invention. Likewise, plus 6 plutonium nitrate may be used to obtain both the tri- and tetrachlorides. The following example sets forth a method for preparing plus 4 plutonium fluoride from plus 4 plutonium nitrate on a larger scale.

*Example IV*

One gram of plutonium plus 4 nitrate crystals are spread out on a platinum sheet in a muffle furnace equipped with a gas inlet tube and outlet. The heat is turned on and the temperature raised to about 130° C. A gaseous mixture comprising 95 percent hydrogen fluoride and 5 percent oxygen is admitted at the rate of about 100 cubic centimeters per minute. The heat is increased rapidly to bring the temperature to about 550° C. These conditions are maintained for about 2 hours at which time the nitrate is substantially converted to the higher valent plutonium tetrafluoride.

Example V sets forth another embodiment whereby plutonyl nitrate is converted to the trichloride.

*Example V*

500 milligrams of plus 6 plutonium nitrate crystals are heated to 125° C. in vacuo for 20 minutes in a nickel reaction tube. The vacuum is broken by admitting a gaseous mixture comprising 90 percent hydrogen chloride and 10 percent hydrogen. The temperature of the tube is raised to about 450° C. while the gaseous mixture is passed therethrough at the rate of 20 cubic centimeters per minute. After 2 hours, the gas flow and heating are stopped, and the reaction products are cooled. The solid plutonium trichloride which has formed is pale bluish-green in color and very pure.

The temperatures employed in the examples which are representative of the most satisfactory operating temperatures may be varied rather widely. In the reacting step, however, it is desirable to employ temperatures in the range of at least 400° C. but not above 600° C. and a temperature of about 500° C. is preferable.

It is thus seen that the method of the instant invention provides a simple, single-step process for rapidly and efficiently converting higher valent plutonium nitrates directly to plutonium halides.

While the advantages of the present invention are manifold, and many embodiments of the invention may be made without departing from the spirit and scope thereof, it is to be understood that this invention is not to be limited except as indicated in the appended claims.

What is claimed is:

1. A dry chemical method of preparing plutonium halides which comprises contacting a dry, crystalline higher valent plutonium nitrate with a dry gaseous hydrohalide of the class consisting of hydrogen chloride and hydrogen fluoride at a temperature of at least 400° C.

2. A dry chemical method of preparing plutonium halides which comprises contacting dry, crystalline higher valent plutonium nitrate with a gaseous hydrohalide of the class consisting of hydrogen chloride and hydrogen fluoride in the presence of a minor amount of a reducing gas at a temperature between 400° C. and 600° C.

3. A dry chemical method of preparing plutonium halides which comprises contacting dry, crystalline higher valent plutonium nitrate with a gaseous hydrohalide of the class consisting of hydrogen chloride and hydrogen fluoride admixed with 2 to 10 percent by volume of hydrogen at a temperature between 400° C. and 600° C.

4. A dry chemical method of preparing plutonium halides which comprises contacting dry, crystalline higher valent plutonium nitrate with a gaseous hydrohalide of the class consisting of hydrogen chloride and hydrogen fluoride in the presence of a minor amount of an oxidizing gas at a temperature between 400° C. and 600° C.

5. A dry chemical method of preparing plutonium halides which comprises contacting dry, crystalline higher valent plutonium nitrate with a gaseous hydrohalide of the class consisting of hydrogen chloride and hydrogen fluoride admixed with 2 to 10 percent by volume of oxygen at a temperature of between 400° C. and 600° C.

6. A dry chemical method of preparing plutonium fluoride which comprises contacting dry, crystalline higher valent plutonium nitrate with dry, gaseous hydrogen fluoride at a temperature between 400° C. and 600° C.

7. A dry chemical method of preparing plutonium fluoride which comprises contacting dry, crystalline higher valent plutonium nitrate with a gaseous mixture comprising dry hydrogen fluoride and from 2 to 10 percent by volume of hydrogen at a temperature between 400° C. and 600° C.

8. A dry chemical method of preparing plutonium fluoride which comprises contacting dry crystalline higher valent plutonium nitrate with a gaseous mixture comprising dry gaseous hydrogen fluoride and from 2 to 10 percent by volume of oxygen at a temperature between 400° C. and 600° C.

9. A dry chemical method of preparing plutonium chloride which comprises contacting dry, crystalline higher valent plutonium nitrate with dry gaseous hydrogen chloride at a temperature between 400° C. and 600° C.

10. A dry chemical method of preparing plutonium chloride which comprises contacting dry, crystalline higher valent plutonium nitrate with a gaseous mixture comprising dry hydrogen chloride and from 2 to 10 percent by volume of hydrogen at a temperature between 400° C. and 600° C.

11. A dry chemical method of preparing plutonium chloride which comprises contacting dry, crystalline higher valent plutonium nitrate with a gaseous mixture comprising dry hydrogen chloride and from 2 to 10 percent by volume of oxygen at a temperature between 400° C. and 600° C.

References Cited in the file of this patent

Johns and Moulton: AEC declassified paper No. LA–193, December 20, 1944 (declassified authority of AEC letter filed February 1, 1957, paper No. 11 in this file), 16 pages, 4 sheets drawings. Only known copy is the one filed with affidavit, paper No. 10.

Seaborg et al.: The Actinide Elements, pages 376, 377, 430 (1954), publ. by McGraw-Hill Book Co., N. Y.